United States Patent
Rudd et al.

(10) Patent No.: US 12,181,374 B2
(45) Date of Patent: Dec. 31, 2024

(54) DYNAMIC WATER LEAK DETECTION

(71) Applicant: Alarm.com Incorporated, Tysons, VA (US)

(72) Inventors: Grant Rudd, Braintree, MA (US); Robert Nathan Picardi, Herndon, VA (US); Daniel Marc Goodman, Needham, MA (US); Craig Carl Heffernan, Oregon City, OR (US); Harrison Wayne Donahue, Attleboro, MA (US); Liam Shea Daly, Needham, MA (US)

(73) Assignee: Alarm.com Incorporated, Tysons, VA (US)

( * ) Notice: Subject to any disclaimer, the term of this patent is extended or adjusted under 35 U.S.C. 154(b) by 706 days.

(21) Appl. No.: 17/379,069

(22) Filed: Jul. 19, 2021

(65) Prior Publication Data
US 2022/0026305 A1    Jan. 27, 2022

Related U.S. Application Data

(60) Provisional application No. 63/056,003, filed on Jul. 24, 2020.

(51) Int. Cl.
*G01M 3/26*    (2006.01)
*G05B 15/02*   (2006.01)

(52) U.S. Cl.
CPC .............. *G01M 3/26* (2013.01); *G05B 15/02* (2013.01)

(58) Field of Classification Search
CPC ...... G01M 3/00; G01M 3/26–28; G05B 15/02
See application file for complete search history.

(56) References Cited

U.S. PATENT DOCUMENTS 8,170,695 B2    5/2012    Spicer et al.
9,261,863 B2    2/2016    Sloop et al.
(Continued)

FOREIGN PATENT DOCUMENTS

| KR | 100942811 B1 * | 2/2010 | ............... G01F 1/00 |
| WO | WO-2017/153997 | 9/2017 | |

(Continued)

OTHER PUBLICATIONS

Machine Translation of KR 100942811 B1 (Year: 2010).*

(Continued)

*Primary Examiner* — Nguyen Q. Ha
(74) *Attorney, Agent, or Firm* — Fish & Richardson P.C.

(57) ABSTRACT

Methods, systems, and apparatus, including computer programs encoded on a storage device, for performing dynamic water leak detection are disclosed. A method includes receiving, from one or more sensors that are located throughout a property, sensor data; determining, based on the sensor data, a water usage mode of the property; selecting, based on the water usage mode, water usage criteria; receiving current water usage data representing water usage at the property; determining, based on the current water usage data, that water usage satisfies the water usage criteria; and in response to determining that the water usage at the property satisfies the water usage criteria, determining that a water leak exists at the property. The method can include storing water usage criteria corresponding to each of multiple different water usage modes, and selecting, from the stored water usage criteria, particular water usage criteria corresponding to the determined water usage mode.

20 Claims, 5 Drawing Sheets

(56) References Cited

U.S. PATENT DOCUMENTS

| | | |
|---|---|---|
| 9,483,737 B2 | 11/2016 | Sanchez Loureda |
| 2005/0062000 A1 | 3/2005 | Bartell, Jr. et al. |
| 2006/0059977 A1 | 3/2006 | Kates |
| 2008/0251131 A1 | 10/2008 | Ford |
| 2011/0022242 A1 | 1/2011 | Bukhin et al. |
| 2012/0022803 A1 | 1/2012 | Donnelly et al. |
| 2012/0139749 A1 | 6/2012 | Belz et al. |
| 2013/0289788 A1 | 10/2013 | Gupta et al. |
| 2015/0160663 A1* | 6/2015 | McCarthy, III ..... H04L 12/2816 700/283 |
| 2016/0201933 A1 | 7/2016 | Hester et al. |
| 2016/0349140 A1 | 12/2016 | Teymouri |
| 2017/0030798 A1 | 2/2017 | DeVerse |
| 2017/0131174 A1 | 5/2017 | Enev et al. |
| 2017/0292893 A1* | 10/2017 | Bunker .................. G01M 3/26 |
| 2018/0045599 A1 | 2/2018 | Larach |
| 2018/0144418 A1 | 5/2018 | Ravid et al. |
| 2019/0025150 A1* | 1/2019 | Picardi ............... G05B 23/0218 |
| 2020/0133315 A1 | 4/2020 | Rasmussen et al. |
| 2020/0378860 A1 | 12/2020 | Picardi et al. |
| 2020/0393324 A1 | 12/2020 | Rudd et al. |
| 2021/0164860 A1* | 6/2021 | Young ..................... E03B 7/071 |
| 2021/0172164 A1* | 6/2021 | Holm .................. E05B 63/0065 |

FOREIGN PATENT DOCUMENTS

| | | |
|---|---|---|
| WO | WO 2019/018852 | 1/2019 |
| WO | WO-2020/014133 | 1/2020 |

OTHER PUBLICATIONS

PCT International Search Report and Written Opinion in International Appln. No. PCT/US2021/042301, dated Oct. 26, 2021, 11 pages.

PCT International Search Report and Written Opinion in International Application No. PCT/US2020/037285, dated Sep. 16, 2020, 14 pages.

Extended European Search Report in European Appln. No. 21846704.1, dated Dec. 1, 2023, 8 pages.

* cited by examiner

DYNAMIC WATER LEAK DETECTION

CROSS-REFERENCE TO RELATED APPLICATION

This application claims the benefit of U.S. Provisional Application No. 63/056,003, filed Jul. 24, 2020, and titled "Dynamic Water Leak Detection," which is incorporated by reference.

TECHNICAL FIELD

This disclosure relates generally to water monitoring technology.

BACKGROUND

Water monitoring is a process that that includes monitoring water usage. Typically, water is monitored using water devices in residential and commercial properties to ensure water flowing into these properties meets user-desired specifications.

One or more water consuming appliances installed at a property may routinely consume water. Typically, water consumed by the one or more water consuming appliances installed at the property is routed to the property via a network of one or more interconnected pipes. A particular pipe of the network of pipes can connect to the property at a metered connection point where water enters the property for routing to the one or more water consuming appliances. This metered connection point provides a location where all water consumed by one or more water consuming appliances installed at the property can be measured. A water consuming appliance may include a washing machine, a dishwasher, a toilet, a shower, an indoor faucet, an outdoor faucet, an irrigation system, or the like.

SUMMARY

Techniques are described for dynamic water leak detection. Dynamic water leak detection can be used to detect leaks in residential and commercial plumbing systems using a water meter.

Water usage at a property can vary greatly based on the status of the occupants of the property. Water usage thresholds can be used to detect leaks, so that if the water usage of a property exceeds the water usage threshold, the leak detection system reports a suspected leak. Water usage thresholds that are appropriate when a property is occupied might allow unwanted water usage to continue when the property is unoccupied, or when the occupants are not using water, such as when the occupants are sleeping. For example, a water usage threshold of 4.0 gal/min may be appropriate when a property is occupied. If the occupants depart the property and leave a faucet running with a flow rate of 1.0 gal/min, the water leak detection system would not detect the running faucet if the threshold remains at 4.0 gal/min. Thus, in order to detect the unwanted water usage, the water usage threshold must be lowered when the property is unoccupied. In this way, dynamic threshold can be used to adjust water usage thresholds based on the occupancy and activity levels at a property to improve accuracy of water leak detection.

Using dynamic thresholds can improve accuracy of leak detections systems while reducing the occurrence of false alarms. For example, a water usage threshold of 0.5 gal/min may appropriate when occupants of a property are asleep. When the occupants awaken and begin using showers and toilets at an average water usage rate of 3.0 gal/min, the water leak detection would falsely detect a leak if the threshold remains at 0.5 gal/min. Thus, in order to reduce the likelihood of a false alarm, the water usage threshold must be raised when the occupants awaken.

Dynamic water leak detection includes adjusting water usage thresholds based on sensor data collected at a property. Sensor data can include, for example, motion sensor data, camera data, audio data, light sensor data, etc. Based on the sensor data, a water usage mode can be selected. Water usage at the property can then be compared to water usage criteria for the selected water usage mode. In this way, leak detection criteria can vary based on information about the property.

A dynamic leak detection system with adjustable thresholds based on occupancy status can allow a leak detection system to detect leaks quickly when water is not expected to be used at the property, e.g., when the residents of the property area way. Having adjustable thresholds based on occupancy status can also reduce the occurrence of false positive leak detections during times when water usage is expected, e.g., when the residents of the property are at home.

In some implementations, users can select to switch the water usage mode, e.g., through a mobile application operating on a mobile device that communicates with the leak detection system. For example, if a resident plans to host a gathering of people, the resident can input a "high activity" mode, causing the water usage threshold to adjust to a higher amount of water usage.

In some implementations, water usage modes can adjust automatically based on sensor data. For example, the water usage mode may switch from an "away" mode to a "home" mode in response to a resident unlocking a door to the property using an access code. In another example, the water usage mode may switch from a "home" mode to an "away" mode in response to geofencing data indicating that a mobile device is outside of a designated range to the property.

In general, one innovative aspect of the subject matter described in this specification can be embodied in a method including: receiving, from one or more sensors that are located throughout a property that is monitored by a monitoring system, sensor data; determining, based on the sensor data, a water usage mode of the property; selecting, based on the water usage mode, water usage criteria; receiving current water usage data representing water usage at the property; determining, based on the current water usage data, that water usage at the property satisfies the water usage criteria; and in response to determining that the water usage at the property satisfies the water usage criteria, determining that a water leak exists at the property.

The foregoing and other embodiments can each optionally include one or more of the following features, alone or in combination. In some implementations, the method includes storing water usage criteria corresponding to each of multiple different water usage modes. Selecting the water usage criteria can include selecting, from the stored water usage criteria, particular water usage criteria corresponding to the determined water usage mode.

In some implementations, storing the water usage criteria includes storing, for each of the multiple different water usage modes, a threshold non-zero water flow rate corresponding to the water usage mode.

In some implementations, each of the multiple different water usage modes represents at least one of an activity level or an occupancy level at the property.

In some implementations, the stored water usage criteria are based on historical water usage data at the property.

In some implementations, the stored water usage criteria are based on historical water usage data at multiple properties.

In some implementations, the water usage criteria include a threshold non-zero water flow rate at the property for the determined water usage mode.

In some implementations, the water usage criteria include a threshold rate of change of water flow rate at the property for the determined water usage mode.

In some implementations, determining the water usage mode includes determining, based on the sensor data, an occupancy of the property; and determining, based at least in part on the occupancy of the property, the water usage mode.

In some implementations, the sensor data includes an arming status of a monitoring system for monitoring the property. Determining the water usage mode can include determining, based at least in part on the arming status, the water usage mode.

In some implementations, determining the water usage mode includes determining, based on the sensor data, an activity level at the property; and determining, based at least in part on the activity level, the water usage mode.

In some implementations, the method includes storing schedule data indicating scheduled water usage modes for multiple different times of day. The sensor data can include data indicating a time of day at the property. Determining the water usage mode can include determining, based at least in part on the time of day at the property and on the schedule data, the water usage mode.

In some implementations, the method includes storing schedule data indicating scheduled water usage modes for multiple different times of day. Selecting the water usage criteria can include determining that a water usage mode of the property differs from a scheduled water usage mode of the property; and changing the water usage criteria from water usage criteria corresponding to the scheduled water usage mode to an adjusted water usage criteria corresponding to the determined water usage mode.

In some implementations, the current water usage data includes an instantaneous measurement of water flow rate at the property.

In some implementations, the current water usage data includes a time-averaged measurement of water flow rate at the property.

In some implementations, determining that water usage at the property satisfies the water usage criteria includes determining that a water flow rate at the property exceeds a threshold water flow rate.

In some implementations, the current water usage data includes a water flow rate measured by a water meter that is configured to measure water flow rate through a water pipe that supplies water to the property.

In some implementations, the method includes transmitting, to a computing device associated with a resident of the property, a notification indicating that a water leak exists at the property.

Implementations of the described techniques may include hardware, a method or process implemented at least partially in hardware, or a computer-readable storage medium encoded with executable instructions that, when executed by a processor, perform the operations.

The details of one or more implementations are set forth in the accompanying drawings and the description below. Other features will be apparent from the description, the drawings, and the claims.

BRIEF DESCRIPTION OF THE DRAWINGS

Like reference numbers and designations in the various drawings indicate like elements.

DETAILED DESCRIPTION

Figure 1A:
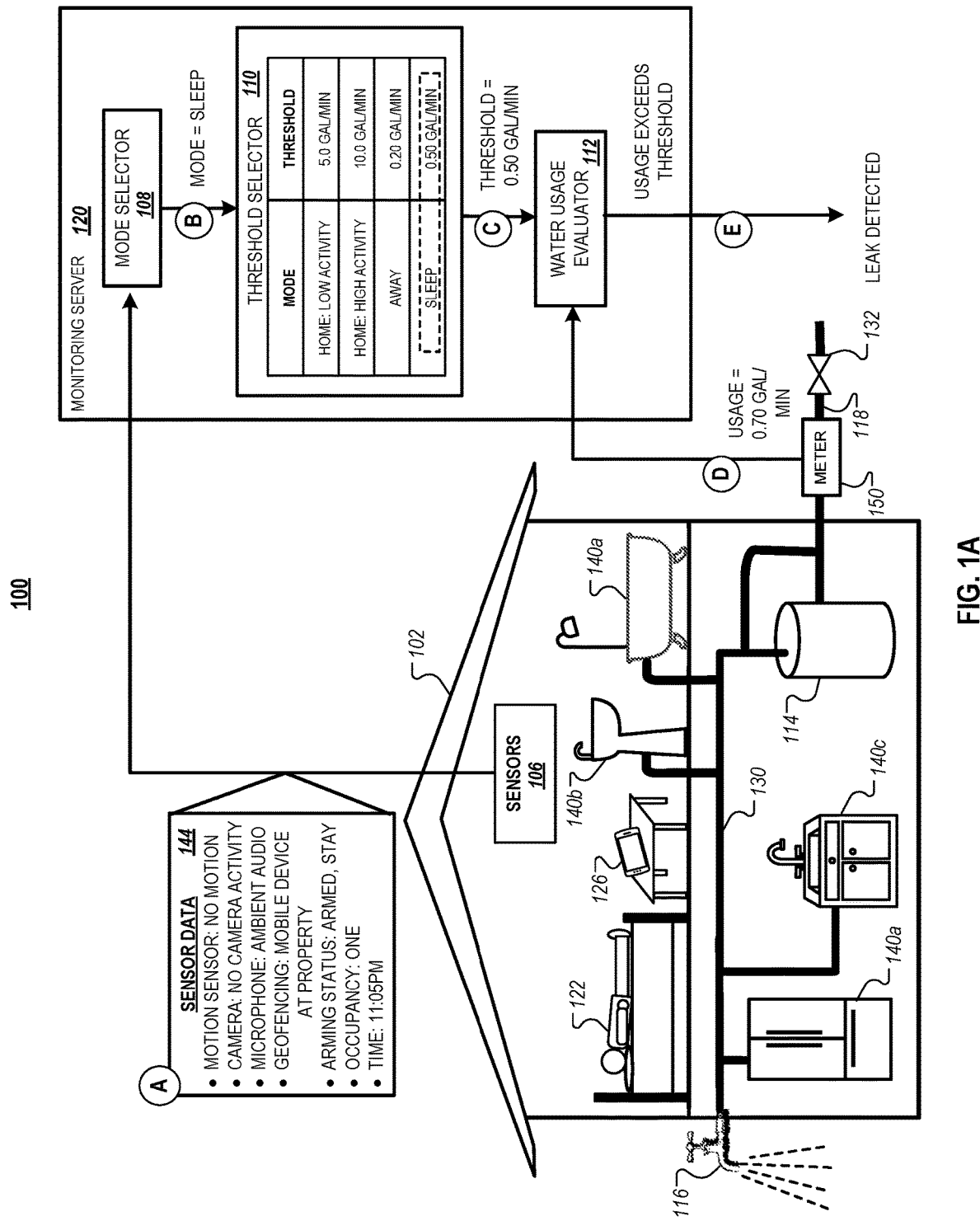
FIGS. 1A and 1B are diagrams illustrating examples of a dynamic water leak detection system.

FIG. 1A is a diagram illustrating an example of a dynamic water leak detection system 100. The system 100 includes a property 102 with a system of pipes 130 for supplying water to fixtures 140a, 140b, 140c, 140d ("140a-d"), where the fixtures 140a-d can be in different locations of the property 102.

In more detail, the water distribution system of the property 102 includes a water heater 114 and a system of pipes 130 for supplying water from a water supply pipe 118 to various locations throughout the property 102. For example, the water supply pipe 118 may connect to a municipal water supply, a well, or another water source. A water meter 150 installed on the water supply pipe 118 measures the flow rate of water through the water supply pipe 118. The flow rate of water through the water supply pipe 118 is indicative of water consumption at the property 102. The water meter 150 can measure water flow through the pipe in units of, e.g., gallons per minute (gal/min), gallons per hour (gal/hour), liters per minute (L/min), or liters per hour (L/hour).

Connected to the pipes 130 are the fixtures 140a-d. The fixtures 140a-d are outlets of the property 102 that dispense water. The fixtures 140a-d can be, for example, sinks, showers, bathtubs, appliances (e.g., a washing machine, a dishwasher), faucets, spigots, sprinklers, or any other fixture in the property 102 from which water is dispensed. The fixtures 140a-d can be located in different areas of the property 102, for example, a fixture 140a that is a bathtub may be located in a bathroom, while another fixture 140c that is a sink may be located in a kitchen. In the example of FIG. 1A, system 100 includes a bathtub 140a and sink 140b, both located in a bathroom, and a sink 140c and a refrigerator 140d, both located in a kitchen.

In system 100, the water meter 150 also communicates with the monitoring server 120. The water meter 150 can then send water flow data to the monitoring server 120. In some examples, the water meter 150 can send water flow data to the monitoring server 120 in real-time. For example, the water meter 150 can transmit, to the monitoring server 120, the amount of water that is flowing to the property 102 at any given time. In some examples, the water meter 150 can send water flow data to the monitoring server 120 periodically or occasionally. For example, the water meter 150 may send the water flow data to the monitoring server 120 at designated intervals, e.g., once per ten minutes, once per half hour, or once per hour.

In some cases, the water flow data can include a snapshot of water usage, e.g., the flow rate of water flowing to the property 102 at a particular moment. In some cases, the water flow data can include an average flow rate of water flowing to the property 102 over a time period.

The monitoring server 120 can determine water usage patterns based on the water usage data from the water meter 150. For example, a dishwasher at the property 102 may run most evenings at approximately the same time as one of the residents of the property 102 takes a shower. Thus, the monitoring server 120 can determine that the water usage of the property 102 is higher in the evening time than during other times of day.

The monitoring server 120 can also generate water usage criteria based on water usage data from the water meter 150. The water usage criteria can be, for example, a water usage threshold that indicates a likely leak at the property 102. In some examples, the water usage criteria can be a range of water usage amounts. If the current water usage falls within the range, the monitoring server 120 can determine that a leak likely exists. In some examples, the water usage criteria can be based on a rate of change of water usage, a difference in water usage between historical water usage and current water usage, or other criteria.

If the water usage of the property 102 meets criteria for a water leak, the monitoring server 120 can determine that there is likely a water leak at the property 102. Determining that the water usage of the property 102 meets criteria for a water leak can include, for example, determining that the water usage of the property 102 exceeds the water usage threshold, falls within the water usage range, or exceeds a threshold rate of change of water usage.

The system 100 includes one or more sensors 106 located throughout the property 102 that collect sensor data related to the property 102. For example, the sensors 106 can include motion detectors that detect movement at a location of the property 102, microphones that detect audio at the property 102, geofencing sensors that identify electronic devices that are at or near the property 102, and cameras that record data related to activity or conditions on the property 102. The sensors 106 can also include occupancy sensors, a clock, an arming status of a security system, door or window lock sensors, smoke detectors, air quality sensors, or other sensors that provide information related to a state or condition of the property 102.

In some cases, the sensors 106 may communicate with a control unit, which can be, for example, a computer system located at the property 102. The control unit can be configured to exchange data with the sensors 106 and to perform various actions and operations for controlling the functionality of the monitoring system components located at the property 102.

The sensors 106 may communicate with a monitoring server 120. For example, a motion detector may send data indicating that movement has been detected. A camera may send still or video images of a portion of the property 102. A microphone may send audio data recorded in a region of the property 102. The monitoring server 120 can be one or more computer or server systems that process, analyze, and/or store data related to the property 102 received from the sensors 106. In some implementations, the monitoring server 120 is remote from the property 102 and the sensors 106 and monitoring server 120 communicate via a long-range data link. The long-range data link can include any combination of wired and wireless data networks. For example, the sensors 106 can exchange information with the monitoring server 120 through a wide-area-network (WAN), a cellular telephony network, a wireless data network, a cable connection, a digital subscriber line (DSL), a satellite connection, or other electronic means for data transmission. The sensors 106 and the monitoring server 120 may exchange information using any one or more of various communication synchronous or asynchronous protocols, including the 802.11 family of protocols, GSM, 3G, 4G, 5G, LTE, CDMA-based data exchange or other techniques.

An example of dynamic water leak detection by the dynamic water leak detection system is illustrated in stages (A) through (E). In the example illustrated in FIG. 1A, a single resident 122 is at the property 102. The resident 122 is asleep.

In stage (A), the sensors 106 send the sensor data 104 to the monitoring server 120. In some examples, the sensors 106 may send the sensor data 104 to a control unit, and the control unit may send the data to the monitoring server 120. The sensor data 104 can include, for example, motion sensor data, camera data, microphone data, and geofencing data. The sensor data 104 can also include an arming status of a property monitoring system and a time of day.

In some examples, the sensor data 104 can include occupancy data. The occupancy data can include the occupancy of the property, the occupancy of individual rooms of a property, or both. In some examples, a computing system may generate the occupancy data based on analyzing other sensor data e.g., motion sensor data, camera data, audio data, geofencing data, door sensors etc. For example, an occupancy sensor, a control unit, or a monitoring server, e.g., the monitoring server 120, may receive the sensor data. Based on analyzing the sensor data, the occupancy sensor, control unit, or monitoring server may generate the occupancy data.

In the example of FIG. 1A the sensor data 104 includes motion sensor data, camera data, microphone data, geofencing data, an arming status, occupancy data, and a time of day.

The sensor data 104 includes a time of day of 11:05 pm. The sensor data 104 includes motion sensor data that indicates no motion currently detected at the property. The motion sensor data may also include historical motion sensor data. For example, the motion sensor data can include historical motion sensor data for the previous several hours or the previous day. The historical motions sensor data may indicate motion of one person throughout the property 102. The motion sensor data may indicate that the motion of the one person ceased earlier in the evening, e.g., 10:30 pm when the resident 122 went to sleep.

The camera data indicates no camera activity at the property 102. Similar to the motion sensor data, the camera data may include historical camera data that indicates human activity throughout the property 102 of the resident 122 until the resident 122 went to sleep. The camera data may include images of the resident 122 turning off lights throughout the property 102 and entering the bedroom.

The microphone data indicates ambient audio detected at the property 102. For example, the ambient audio can include sounds of an HVAC system, fan, or other background sounds at the property 102.

The arming status of the monitoring system of the property 102 is set to "armed, stay." The arming status "armed, stay" indicates that at least one resident is likely at the property 102, and that the security system is armed. In some cases, the arming status may be selected by a user, e.g., the resident 122. In some cases, the arming status may be pre-programmed, e.g., based on the time of day.

The occupancy data indicates that the property 102 is occupied by one person. The occupancy data may be generated based on other sensor data, as described above. For example, the occupancy data may be generated based at least in part on geofencing data.

The geofencing data indicates that mobile device 126 is located at or near the property 102. The geofencing data can be based on, for example, a GPS location of the mobile device 126 being at or near a GPS location of the property 102. In some cases, the geofencing data can be based on a connection between the mobile device 126 and other devices at the property 102. For example, the geofencing data can be based on a Wi-Fi signal connecting to the mobile device 126 or a Bluetooth signal connecting to the mobile device 126. In some cases, the geofencing data may include an indication of the room in which the mobile device 126 is located. For example, the geofencing data in the example of FIG. 1A may indicate that the mobile device 126 is in the bedroom.

In some examples, the sensor data 104 can include data from entry points of the property 102, e.g., doors. For example, the sensor data 104 may indicate a time of opening and shutting a front door of the property 102. In another example, the sensor data 104 may indicate a lock status of a door to the property 102, whether or not the door was locked from the inside, from the outside, or remotely, and a time of locking or unlocking the door.

In stage (B), the monitoring server 120 receives the sensor data 104. The monitoring server 120 includes a mode selector 108, a threshold selector 110, and a water usage evaluator 112. The mode selector 108, the threshold selector 110, and the water usage evaluator 112 can each be provided as one or more computer executable software modules or hardware modules. That is, some or all of the functions of the mode selector 108, the threshold selector 110, and the water usage evaluator 112 can be provided as a block of computer code, which upon execution by a processor, causes the processor to perform functions described below. Some or all of the functions of mode selector 108, the threshold selector 110, and the water usage evaluator 112 can be implemented in electronic circuitry, e.g., by individual computer systems (e.g., servers), processors, microcontrollers, a field programmable gate array (FPGA), or an application specific integrated circuit (ASIC).

The mode selector 108 selects a mode based on the sensor data 104. The modes represent occupancy levels and activity levels at the property 102. Example modes can include an "away" mode for when the residents of the property 102 are away from the property 102, and a "sleep" mode for when the residents of the property 102 are asleep.

The modes can also include modes that correspond to various activity levels at the property 102. For example, the modes can include a low activity mode for when the occupancy and/or activity level of the property 102 is low. The low activity mode may be selected, e.g., when only one person is at the property 102, when only a few people are at the property 102, when the people at the property 102 are generally stationary, etc. For example, the low activity mode can be selected when several people are at the property 102 and are eating a meal or watching television in the evening.

The modes can also include a high activity mode for when the occupancy and/or activity level of the property 102 is high. The high activity mode may be selected, e.g., when many people are at the property 102, when the people at the property are generally active, etc. For example, the high activity mode can be selected when several people are at the property 102 and are getting ready for work and school in the morning. In another example, the high activity mode can be selected when people are gathering at the property 102, e.g., for a party.

When the property is occupied, the mode may switch between a low activity mode, a medium activity mode, and a high activity mode based on sensor data. For example, if an occupant of the property is watching television, the sensor data may include one or more of motion sensor data indicating low motion levels, light sensor data indicating low lighting levels, audio data indicating sounds produced by the television, or status data from the television that indicates that the television is being watched. Based on the sensor data, the monitoring server may select a low activity mode. When the occupant takes a break from watching television, the occupant may pause the television, turn on a light, and walk away from the television. The sensor data may then include one or more of motion sensor data indicating motion, light sensor data indicating higher lighting levels, audio data that does not include sounds from the television, or status data from the television that indicates that the television is not being watched. Based on the sensor data, the monitoring server may select a medium or high activity mode, resulting in a higher water usage threshold. Thus, if the occupant uses water fixtures, e.g., in a kitchen or bathroom, the monitoring server 120 will not falsely detect a leak.

Other modes are possible. For example, a commercial property may have modes related to a status of a business located at the property. The commercial property may have, for example, an "open" mode corresponding to time when the business is open, and a "closed" mode corresponding to times when the business is closed. Businesses may also have a mode that corresponds to occupancy only by employees, and a mode that corresponds to occupancy by employees as well as customers or clients.

The mode selector 108 selects the mode based on the sensor data 104. In some examples, the mode selector 108 may initially select a programmed mode and may switch to an adjusted mode based on the sensor data 104.

Figure 2:
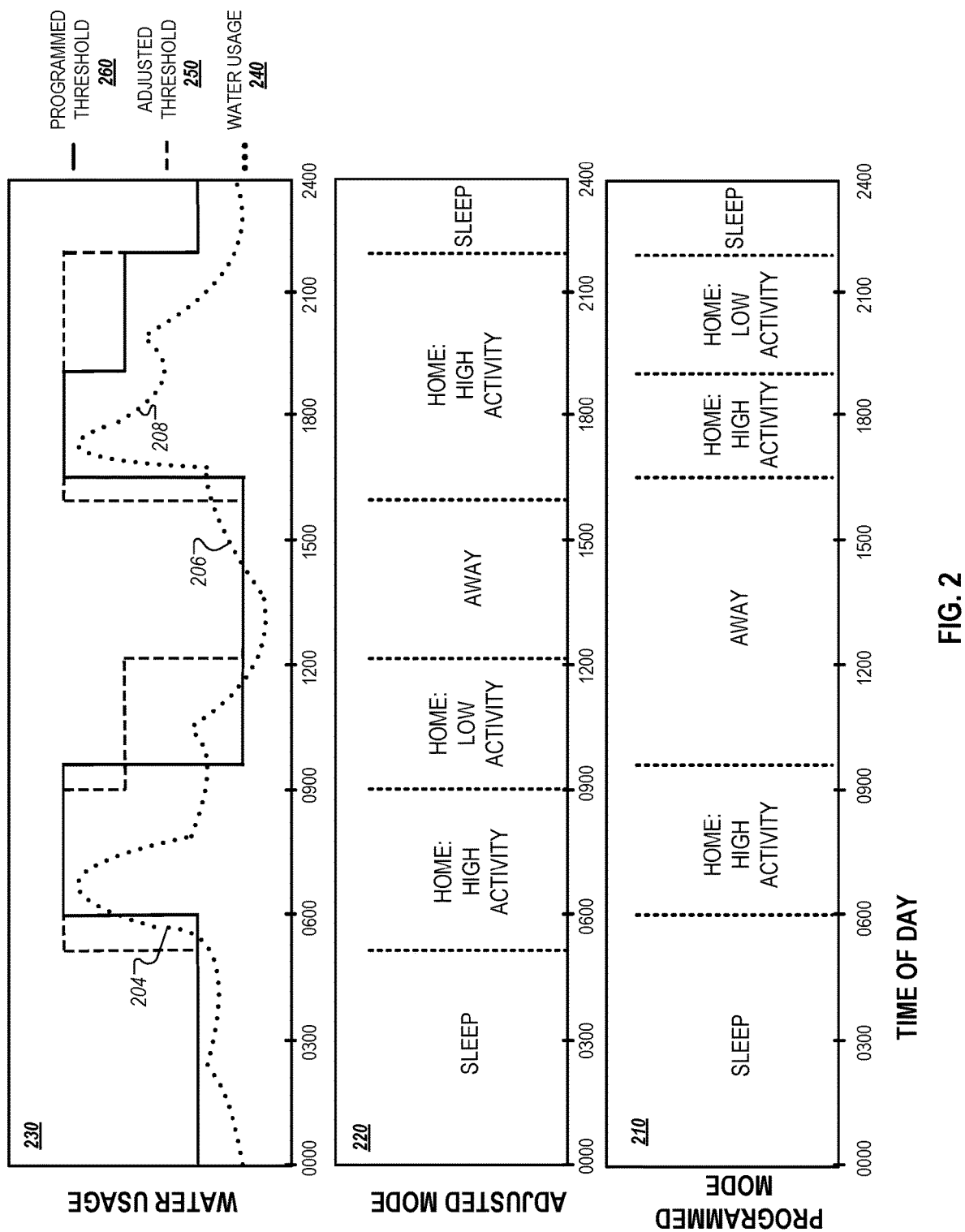
FIG. 2 illustrates graphs of example water usage modes and usage.

Example programmed modes and adjusted modes are illustrated in FIG. 2. FIG. 2 includes graph 210, showing programmed modes over the course of a day, and graph 220, showing adjusted modes over a course of the day.

In some cases, the programmed mode may change based on a time of day. For example, as shown in graph 210, the programmed mode is "sleep" between 2200 and 0600, is "home: high activity" between 0600 and 1000, and is "away" between 1000 and 1630. The programmed modes might not be the same for each day. For example, the programmed modes may be different on weekends than on weekdays, or may be different in summer time than in winter time.

In some examples, the programmed mode is based on default settings that may apply to multiple properties. For example, the default settings may include a waking time, sleep time, departure time, and return time that is preprogrammed based on average behavior patterns of multiple properties.

In some examples, the programmed mode is based on settings input by a user. For example, the user may input a waking time of 0600 and a bedtime of 2200. The user may also input a departure time for work of 1000 and a return time of 1630. The monitoring server 120 can configure the programmed mode settings based on the user input.

User input can also include demographic information that can be used to determined programmed mode settings. For example, the user input can include a number of residents at the property and ages of the residents. The user input can also include information such as whether any of the residents work night shifts and whether any of the residents work from home.

In some examples, the programmed mode is based on patterns of sensor data collected at the property 102. For example, the system 100 may undergo a calibration period upon installation at the property 102. The monitoring server 120 can collect sensor data 104 over a period of time, e.g., of several days or weeks. The monitoring server 120 can identify patterns of occupancy and activity levels. The monitoring server 120 can then establish the programmed modes based on the sensor data.

In some examples, the programmed mode is based on any combination of default settings, user settings, and sensor data. For example, the user may input bedtimes, waking times, departure times, and return times. The monitoring server 120 can then update or fine-tune the programmed mode based on collected sensor data. For example, the user may input a waking time of 0600. The monitoring server 120 may observe, based on motion sensor data, camera data, etc., an average waking time of 0615 over the course of a time period, e.g., a month. Based on the observed average waking time, the monitoring server 120 can update the waking time from 0600 to 0615.

The programmed mode can serve as a base mode for the mode selector 108. That is, the mode selector 108 can select the programmed mode for the particular time of day unless sensor data indicates that an adjusted mode should be selected. In some cases, the mode selector 108 can select the programmed mode for the particular time of day when the sensor data 104 is not available or is inconclusive. When the sensor data 104 is available and indicates that an adjusted mode should be selected, the adjusted mode may override the programmed mode, such that the mode selector 108 selects the adjusted mode.

For example, on a particular weekday, the resident 122 may accidentally leave the mobile device 126 at the property 102 and may forget to set the security system to "armed, away." At noon on the particular weekday, sensor data may indicate that the mobile device 126 is located at the property and that the security system status is "unarmed, stay." However, motion sensor data and camera data may indicate that the property is not occupied. The mode selector 108 may determine that the sensor data is inconclusive as to the occupancy and activity of the property 102. The mode selector 108 may therefore select the programmed mode of "away."

Graph 220 shows adjusted modes for an example particular day. On the particular day, the resident 122 awakens at 0530 instead of the programmed time of 0600. As shown in the graph 210, the programmed mode changes from "sleep" mode to "home: high activity mode" at 0600. However, based on the sensor data 104, the mode selector 108 determines that the resident 112 has risen earlier on the particular day than is indicated by the programmed mode. Thus, as illustrated in graph 220, the mode selector 108 determines to switch from "sleep" mode to "home: high activity mode" at 0530 instead of at 0600.

Similarly, in graph 210, the programmed mode changes from "home: high activity" to "home: low activity" at 1900. Typically, this may correspond to a time of day when the resident eats dinner and reads a book. However, on the particular day, the resident may host a dinner party at the property 102. Based on the sensor data 104, the mode selector 108 determines that the occupancy and activity levels of the property 102 are higher than would be expected in low activity mode. Thus, in graph 220, the mode selector 108 determines to remain in "home: high activity mode" past 1900.

In the example of FIG. 1A, in stage (B), the mode selector 108 select the "sleep" mode. The mode selector 108 selects the "sleep" mode based on the sensor data 104, including the late time of day, the status of "armed, stay," geofencing data indicating the mobile device 126 is at the property 102, and the lack of motion, camera activity, and audio detected at the property 102. The mode selector 108 outputs the selected mode of "sleep" to the threshold selector 110.

In some examples, the mode selector 108 may select the same mode for a status of "armed, stay" as for "unarmed, stay," as both statuses indicate that the property 102 is likely occupied. In some examples, the mode selector 108 may select a different mode for a status of "armed, stay" than for "unarmed, stay." For example, a status of "unarmed, stay" may indicate that the resident 122 is awake and active and/or is expecting visitors. A status of "armed, stay" may indicate that the resident 122 is sleeping or is not expecting visitors. Thus, in some examples, the mode selector 108 may be programmed to select a sleep mode when the status is "armed, stay" and to select a low activity mode when the status is "unarmed, stay." In another example, the mode selector 108 may be programmed to select a low activity mode when the status is "armed, stay" and to select a high activity mode when the status is "unarmed, stay."

In stage (C), the threshold selector 110 selects a water usage threshold that corresponds to the selected mode. Each mode may have a corresponding water usage threshold, or range of expected water usages.

Example thresholds are shown in graph 230. The graph 230 shows a programmed threshold 260, represented by a solid line. The programmed threshold 260 corresponds to the programmed mode, shown in the graph 210. Thus, the programmed threshold 260 changes when the programmed mode changes.

The graph 230 also shows an adjusted threshold 250, represented by a dashed line. The adjusted threshold corresponds to the adjusted mode, shown in the graph 220. Thus, the adjusted threshold 250 changes when the adjusted mode changes.

The water usage threshold for each mode may be determined and stored by the monitoring server 120. The water usage threshold is a water usage level that indicates a likely leak at the property 102. The water usage threshold is based on a number of factors related to the particular property 102 and to typical resident behavior at the property 102.

The monitoring server 120 may determine the water usage threshold for each mode based at least in part on information related to the plumbing systems at the property 102. For example, the plumbing system information can include a number and type of plumbing fixtures at the property. The plumbing system information can also include a number and type of plumbing fixtures that may operate automatically, e.g., without human interaction. For example, an ice maker or automatic sprinkler system may operate without human interaction. Additionally, appliances such as coffee makers and dishwashers may be capable of operation without human interaction. For example, a resident may program a dishwasher to begin a cycle at a certain time when the resident may or not be home.

The water usage threshold can be based on a maximum expected water usage for a given mode. For example, in "home: low activity" mode, expected water usage may be based on occasional use of a sink or toilet. In "home: high activity" mode, expected water usage may be based on use of a clothes washing machine, dishwasher, showers, sinks, and toilets. In "away" mode, expected water usage may be based on plumbing fixtures that can operate without human interaction. Thus, the water usage threshold may be lower for modes of low occupancy and low activity than for higher occupancy and higher activity.

For example, referring to the graph 230, the water usage threshold is higher for "home: high activity" mode than for "home: low activity" mode. The water usage threshold is also higher for "away" mode than for ""sleep" mode."

The monitoring server 120 may also determine the water usage threshold for each mode based on information related to water usage trends at the property 102. For example, over a period of time, e.g., a week or a month, the monitoring server 120 can average water usage levels at night at the property 102. The water usage threshold for "sleep" mode can then be based on the average water usage levels at night at the property 102. The monitoring server 120 can determine the water usage threshold for "sleep" mode, e.g., by selecting water usage level that is a margin greater than the average water usage levels. The margin may be, for example, 30% 50%, or 100% greater than the average water usage levels. For example, if the average water usage level at night at the property is 0.10 gal/min, the monitoring server 120 may determine a water usage threshold level of 0.20 gal/min.

In the example of FIG. 1A, the water usage threshold for "home: low activity" mode is 1.0 gal/min. The water usage threshold for "home: high activity" mode is 10.0 gal/min. The water usage threshold for "away" mode is 0.20 gal/min. The water usage threshold for "sleep" mode is 0.50 gal/min.

In stage (C), the threshold selector 110 selects the threshold 0.50 gal/min corresponding to the selected "sleep" mode. Since there is only one resident 122 at the property 102, and the resident 122 is asleep, the property 102 is expected to use very little water while in the "sleep" mode.

In stage (D), the water meter 150 sends water usage data to the monitoring server 120. In some cases, the water flow data can include an average flow rate of water flowing to the property 102 over a time period. For example, the water flow data can include an average flow rate of water flowing to the property 102 over a time period of a minute, ten minutes, thirty minutes, an hour, etc. In some examples, the water meter 150 may average the water usage and may send the average water usage data to the monitoring server 120. In some examples, the water meter 150 may transmit water usage data in real-time, and the monitoring server 120 may calculate the average water usage.

Averaging the water usage can improve the detection of water leaks while reducing the number of false alarms. Some plumbing fixtures may use a large amount of water in a short amount of time, and may otherwise not use water. The water meter can average the water usage in order to prevent short bursts of water usage from triggering a false alarm for a water leak.

For example, a toilet may use 1.3 gallons of water over a time period of a few seconds. The toilet may otherwise not consume water. If the water meter 150 averages the water usage over the course of ten minutes, and a single toilet flush occurs during the ten minutes, the water meter 150 may determine an average water usage of 0.15 gallons per minute. In the example of FIG. 1A, the water usage threshold for "sleep" mode is 0.20 gallons per minute. Therefore, a toilet flush occurring while in "sleep" mode, with the water usage averaged over ten minutes, will not result in a leak being detected.

The monitoring server 120 may adjust the water usage threshold according to the water usage measurement time periods. For example, the monitoring server 120 may raise the water usage threshold to accommodate shorter time periods for averaging water usage. The monitoring server 120 may lower the water usage threshold to accommodate longer time periods for averaging water usage.

The water usage evaluator 112 evaluates the water usage to determine if the water usage meets criteria for a leak. The water usage evaluator 112 can compare the water usage to the water usage threshold to determine if the water usage exceeds the water usage threshold.

A graph of water usage 240 is shown in graph 230. The water usage 240 of a property is represented by a dotted line. The graph of water usage 240 shows the water usage at the property over the course of an example day. Water usage 240 can be measured, for example, in gal/min, gal/hour, L/min, or L/hour.

In the graph 230, there are times throughout the example day at which the water usage 240 is less than the programmed threshold 260 and is less than the adjusted threshold 250. For example, at point 208, which corresponds approximately to time 1800, the water usage 240 is less than the programmed threshold 260 and the adjusted threshold 250.

In the graph 230, there are times throughout the example day during which the water usage 240 is less than the adjusted threshold 250 but is not less than the programmed threshold 260. For example, at point 204, which corresponds approximately to time 0550, the water usage 240 is less than the adjusted threshold 250 but is not less than the programmed threshold 260. Therefore, if the mode selector 108 selected the programmed mode and did not select the adjusted mode, the monitoring server 120 would detect a false suspected leak. However, the adjusted mode overrides the programmed mode, and the mode selector selects the adjusted mode, preventing a false alarm.

In the graph 230, there are times throughout the example day at which the water usage 240 is greater than the programmed threshold 260 and the adjusted threshold 250. For example, at point 206, which corresponds approximately to time 1500, the water usage 240 is greater than both the programmed threshold 260 and the adjusted threshold 250. Therefore, the water usage evaluator 112 may determine that a water leak is likely occurring at approximately time 1500.

In the example of FIG. 1A, the water meter 150 transmits a water usage of 0.70 gal/min to the monitoring server. The water usage of 0.70 gal/min is due to an open hose bib 116 that is leaking water. The water usage of 0.70 gal/min may be a real-time indication of water usage or may be averaged over a time period, e.g., of several minutes.

The water usage evaluator 112 compares the water usage of 0.70 gal/min to the water usage threshold of 0.50 gal/min. The water usage evaluator 112 determines that the water usage exceeds the water usage threshold.

In stage (E), the monitoring server 120 determines that a leak is detected at the property 102. As a result of determining that the leak is detected, the monitoring server 120 may perform one or more actions.

In some implementations, the monitoring server 120 can communicate with an authorized user device, e.g., the mobile device 126, and the monitoring server 120 can send a notification or alert to the mobile device 126. The user device 126 can be, for example, a mobile phone, a smart phone, a tablet computer, a smart watch, or another mobile computing device. The user device can also be a personal computer, a laptop computer, a smart speaker, an electronic home assistant, or another computing device. In some examples, the user device can be a robotic device.

In some examples, the monitoring server 120 may send a notification to the mobile device 126 that indicates that a leak is suspected at the property. The notification can also include a time of detection of the leak and the flow rate of the suspected leak. In some examples, the monitoring server 120 may place a telephone call to the mobile device 126 or to a telephone at the property 102 to notify the resident 122 of the suspected leak.

The mobile device 126 can execute one or more software applications that enable it to communicate with the monitoring server 120 and/or a control unit at the property 102. Through the software application, the mobile device 126 can receive notifications or alerts from the monitoring system and/or send commands to the monitoring system to control various system actions or operations.

In some examples, the monitoring server 120 may send instructions directing one or more automatic devices at the property to operate. For example, the property 102 may have a shut-off valve 132 that is capable of remote operation. In response to detecting the suspected leak at the property 102, the monitoring server 120 may send an instruction to the shut the shut-off valve 132 in order to stop water flow to the property 102. Shutting the shut-off valve causes the hose bib 116 to stop leaking water.

In some implementations, the monitoring server 120 can apply one or more rules to determine actions to perform. For example, the monitoring server 120 can apply a rule indicating that whenever a leak is detected, the monitoring server 120 sends a notification to the mobile device 126. In another example, the monitoring server 120 can apply a rule indicating that when the mode is "away" and a leak is detected, the monitoring server 120 sends a command to the shut-off valve 132 to stop water flow to the property 102. The rules can be predetermined (e.g., default rules) and stored in a memory system accessible by the monitoring server 120. In some implementations, a user, e.g., the resident 122 can adjust, remove, or add rules to customize the monitoring server 120 response for their particular property 102 and preferences.

Though described above as being performed by the monitoring server 120, stages (B) through (E) can be performed by a control unit, by the water meter 150, by a combination of a control unit, the monitoring server 120, and the water meter 150, or by another computer system.

Figure 1B:
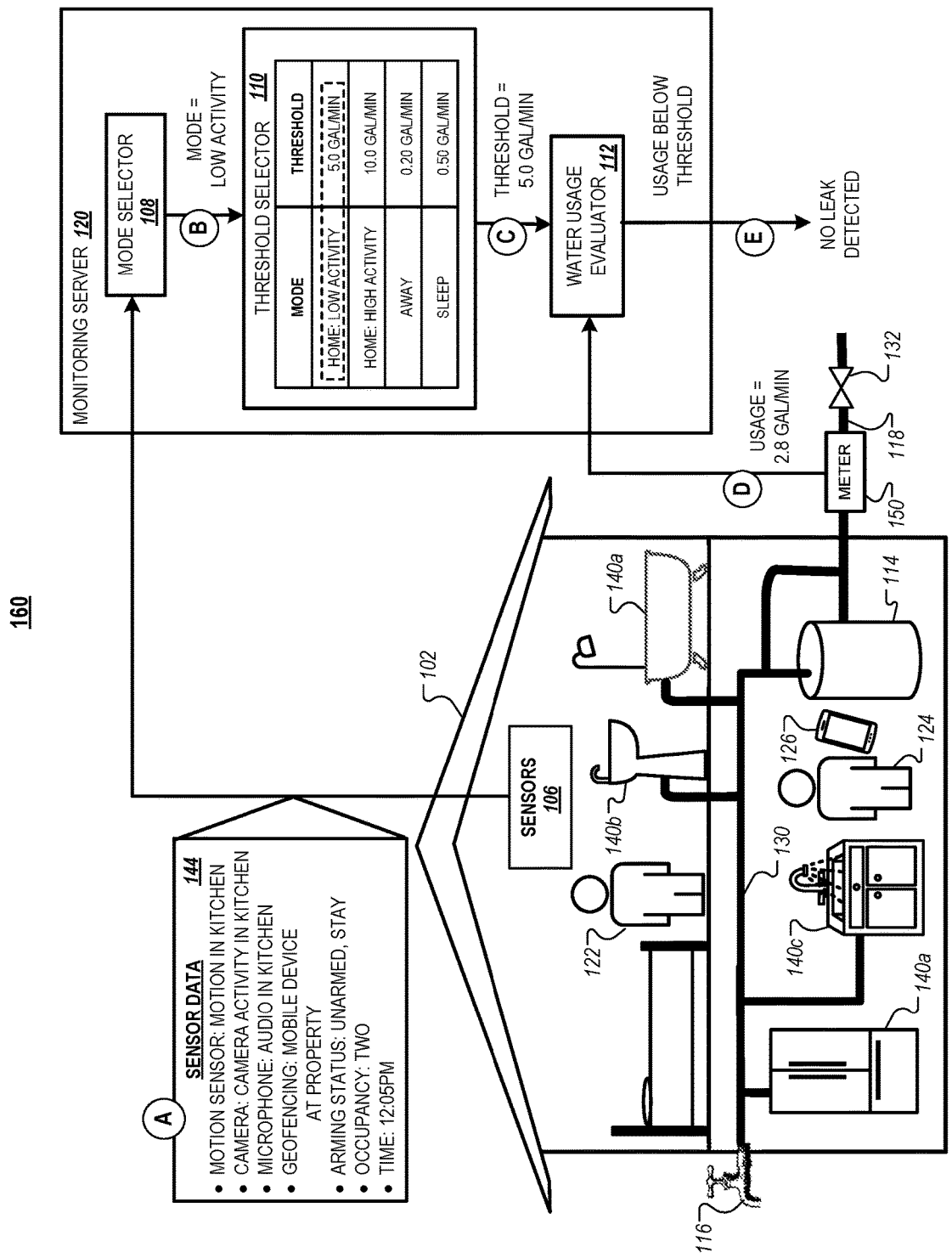

FIG. 1B is another diagram illustrating an example of a dynamic water leak detection system 160. The system 160 may operate similarly to the system 100 described in FIG. 1A. An example of dynamic water leak detection by the system 160 is illustrated in stages (A) through (E). In the example illustrated in FIG. 1B, two residents 122, 124 are at the property 102. The resident 122 is in the bedroom and the resident 124 is in the kitchen. The resident 124 is using water from the sink 140c.

In stage (A) of FIG. 1B, the sensors 106 send sensor data 144 to the monitoring server 120. The sensor data 144 includes a time of day of 12:05 pm. The sensor data 144 includes motion sensor data that indicates motion detected in the kitchen at the property 102. The camera data also indicates camera activity in the kitchen at the property 102. The microphone data indicates audio detected at the property 102. For example, the audio can include sounds of the resident 124 listening to music or talking on the phone.

The arming status of the monitoring system of the property 102 is set to "unarmed, stay." The arming status "unarmed, stay" indicates that at least one resident is likely at the property 102, and that the security system is unarmed.

The occupancy data indicates that the property 102 is occupied by two person. The occupancy data may be generated based on other sensor data, as described above. For example, the occupancy data may be generated based at least in part on geofencing data. The geofencing data indicates that mobile device 126 is located at or near the property 102.

In stage (B), the monitoring server 120 receives the sensor data 144. The mode selector 108 selects a mode based on the sensor data 144. The mode selector 108 selects the "home: low activity" mode based on the sensor data 144, including the mid-day time of day, the occupancy of two people, geofencing data indicating the mobile device 126 is at the property 102, and the motion, camera activity, and audio detected at the property 102.

In stage (C), the threshold selector 110 selects water usage criteria that correspond to the selected mode. The water usage criteria can include a water usage threshold. In the example, of FIG. 1A, the threshold selector 110 selects water usage criteria including a water usage threshold of 5.0 gal/min corresponding to the selected "home: low activity" mode. Since there are two residents 122, 124 at the property 102, and only one plumbing fixture is in use, the property 102 is expected to use more water than in the "sleep" or "away" modes, but less water than in the "home: high activity" mode.

In stage (D), the water meter 150 sends water usage data to the monitoring server 120. The water meter 150 transmits a water usage of 2.8 gal/min to the monitoring server 120. The water usage of 2.8 gal/min is due to the water flowing to the sink 140c.

The water usage evaluator 112 compares the water usage of 2.8 gal/min to the water usage threshold of 5.0 gal/min. The water usage evaluator 112 determines that the water usage is below the water usage threshold.

In stage (E), the monitoring server 120 determines that no leak is detected at the property 102, based on the water usage being below the water usage threshold.

Figure 3:
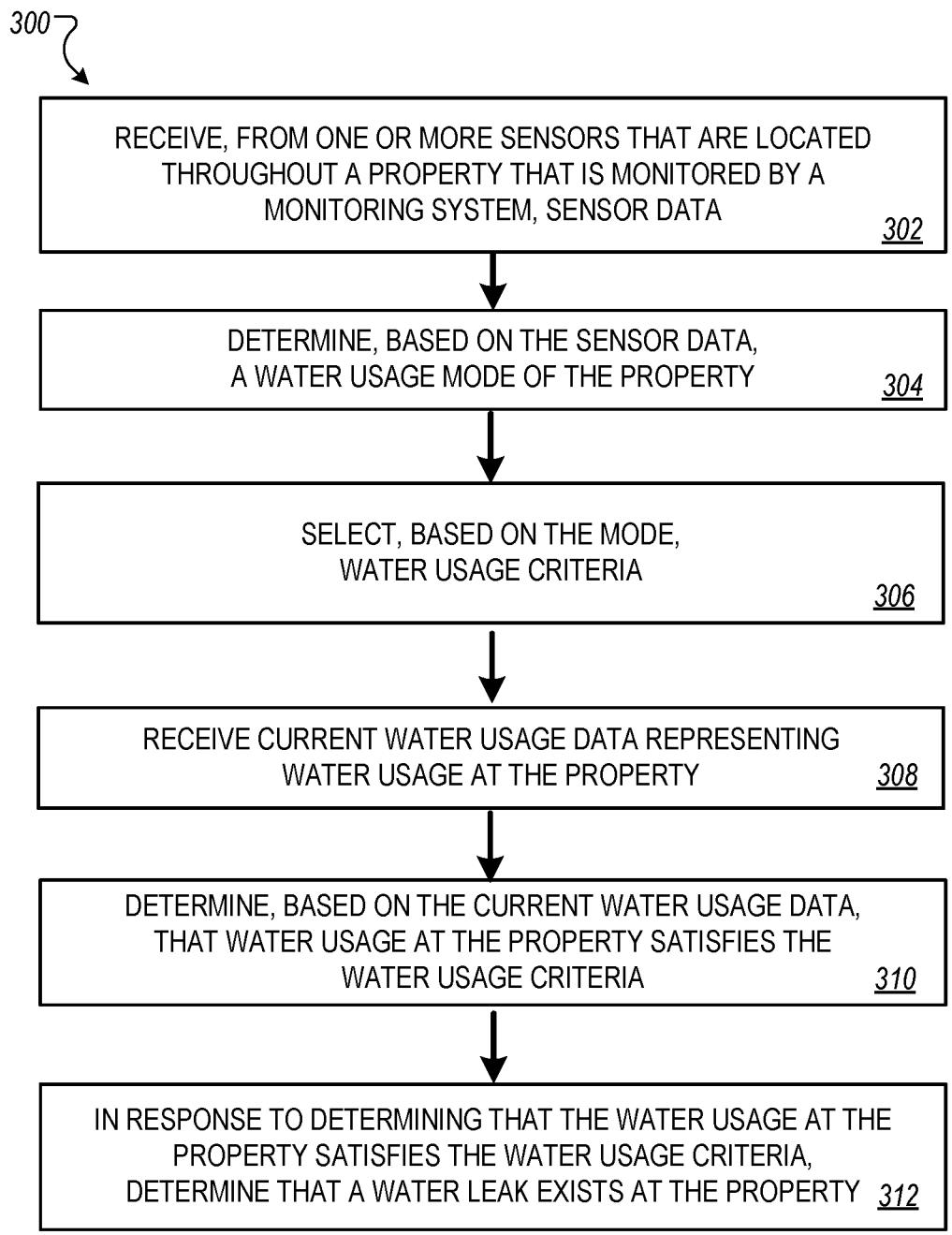
FIG. 3 is a flow diagram illustrating an example of a process for dynamic water leak detection.

FIG. 3 is a flow diagram illustrating an example of a process 300 for using a dynamic water leak detection system. The process 300 can be performed by a server, for example, the monitoring server 120 of system 100. In some implementations, the process 300 can be performed by a control unit of a monitoring system or by the water meter 150. The process 300 can also be performed by a combination of a control unit and a server, a server and a meter, a control unit and a meter, or another computer system. Briefly, process 300 includes receiving sensor data (302), determining a water usage mode of the property (304), selecting water usage criteria (306), receiving current water usage data (308), determining that water usage at the property satisfies the water usage criteria (310), and determining that the water usage satisfies the water usage criteria (312).

In more detail, in step 302 the system receives, from one or more sensors that are located throughout a property that is monitored by a monitoring system, sensor data. (302). For example, the monitoring server 120 can receive sensor data from the sensors 106. The sensor data may include motion sensor data indicating motion activity throughout the property 102. The sensor data can also include camera data including images of multiple people at the property, e.g., ten people at the property 102. The sensor data can include microphone data including audio sounds detected throughout the property 102. The audio sounds can indicate sounds of people conversing throughout the property. The sensor data can include occupancy data indicating an occupancy of ten people at the property.

In step 304, the system determines, based on the sensor data, a water usage mode of the property. For example, the motion sensor data, camera activity data, and audio data detected throughout the property can indicate high occupancy at the property, high levels of activity at the property, or both. The mode selector 108 may select a mode of "home: high activity" based on the sensor data.

In some examples, each of the multiple different water usage modes represents at least one of an activity level or an occupancy level at the property. For example, a first water usage mode can represent low activity, a second activity mode can represent high activity, a third water usage mode can represent that the property is unoccupied, a fourth water usage mode can represent that the property is occupied at a low occupancy, and a fifth water usage mode can represent that the property is occupied at a high occupancy.

In some examples, determining the water usage mode includes: determining, based on the sensor data, an occupancy of the property; and determining, based at least in part on the occupancy of the property, the water usage mode. For example, the mode selector 108 may select the mode of "home: high activity" based at least in part on the sensor data indicating an occupancy of ten people. The mode selector 108 can select a mode of "home: low activity" based at least in part on the sensor data indicating an occupancy of three people.

In some examples, the sensor data includes an arming status of a monitoring system for monitoring the property. Determining the water usage mode can include determining, based at least in part on the arming status, the water usage mode. For example, the mode selector 108 may select the mode of "away" based at least in part on the arming status of the monitoring system being "armed, away." The mode selector 108 may select the mode of "home: low activity" based at least in part on the arming status of the monitoring system being "unarmed, stay."

In some examples, the system stores schedule data indicating scheduled water usage modes for multiple different times of day. The sensor data can include data indicating a time of day at the property. The system can determine the water usage mode based at least in part on the time of day at the property and on the schedule data. For example, the monitoring server 120 can store a schedule of programmed modes, e.g., as shown in graph 210. The schedule can indicate a scheduled water usage mode of "sleep" between 0000 and 0600, or "home: high activity" between 0600 and 0930, of "away" between 0930 and 1630, etc. The sensor data can include data indicating that a time of day at the property is 1200. The monitoring server 120 can determine a water usage mode of "away" based at least in part on the time of day of 1200 and the schedule data indicating the programmed mode of "away" between 0930 and 1630.

In step 306, the system selects, based on the mode, water usage criteria. In some examples, the system stores water usage criteria corresponding to each of multiple different water usage modes. For example, the monitoring server 120 can store water usage thresholds corresponding with each of multiple water usage modes. The monitoring server 120 can store water usage criteria including a threshold of 5.0 gallons per minute for a water usage mode of home: low activity, and water usage criteria including a threshold of 10.0 gallons per minute for a water usage mode of home: high activity.

In some examples, storing the water usage criteria includes storing, for each of the multiple different water usage modes, a threshold non-zero water flow rate corresponding to the water usage mode. For example, based on the "home: high activity mode," the threshold selector 110 can select a corresponding water usage threshold. The threshold selector 110 may select the non-zero water flow rate threshold of 10.0 gal/min. The water usage threshold of 10.0 gal/min may be a maximum expected water usage at the property during times of high activity. The water usage threshold of 10.0 gal/min may account for operation of multiple plumbing fixtures at the property.

Selecting the water usage criteria can include selecting, from the stored water usage criteria, particular water usage criteria corresponding to the determined water usage mode. For example, the threshold selector 110 can select water usage criteria of 0.50 gallons per minute corresponding to a determined water usage mode of "sleep."

In some examples, the water usage criteria include a threshold non-zero water flow rate at the property for the determined water usage mode. For example, the water usage criteria for the determined water usage mode of "home: high activity" can include a maximum threshold non-zero water flow rate of 10.0 gallons per minute. The water usage criteria can also include minimum threshold non-zero water flow rate, e.g., of 0.050 gallons per minute.

In some examples, the water usage criteria include a threshold rate of change of water flow rate at the property for the determined water usage mode. Based on the determined mode of "home: high activity," the threshold selector 110 can select a corresponding threshold rate of change of water usage, e.g., that represents a maximum expected rate of change of water usage at the property during times of high activity. The maximum expected rate of change of water usage can be, for example, 3.0 gallons per square minute, 5.0 gallons per square minute, 7.0 gallons per square minute, etc.

In some examples, the system stores schedule data indicating scheduled water usage modes for multiple different times of day. Selecting the water usage criteria can include determining that a water usage mode of the property differs from a scheduled water usage mode of the property; and changing the water usage criteria from water usage criteria corresponding to the scheduled water usage mode to an adjusted water usage criteria corresponding to the determined water usage mode. For example, the monitoring server 120 can store the schedule of programmed modes as shown in graph 210. The monitoring server 120 can determine, based on sensor data, that the property is occupied at a time of 1200. Based on determining that the property is occupied, the mode selector 108 can determine that the water usage mode of the property is "home: low activity" and that the water usage mode of the property differs from the scheduled water usage mode of "away." Based on determining that the water usage mode differs from the scheduled water usage mode, the threshold selector 110 can change the water usage criteria from the water usage criteria corresponding to the "away" water usage mode to adjusted water usage criteria corresponding to the "home: low activity" water usage mode. For example, the threshold selector 110 can change the water usage criteria from the programmed threshold 260 to the adjusted threshold 250 as shown in the graph 230.

In some examples, the stored water usage criteria are based on historical water usage data at the property. For example, historical water usage data at the property can indicate that when the occupancy of the property is three people, and when the three people are not sleeping, average water usage at the property is 4.0 gallons per minute. The monitoring server 120 can therefore determine that a maximum threshold water usage for a water usage mode of "home: low activity" is an amount greater than 4.0 gallons per minute, e.g., 6.0 gallons per minute.

In some examples, the stored water usage criteria are based on historical water usage data at multiple properties. For example, historical water usage data at multiple properties can indicate that when the occupancy of properties is between five and seven people, and when the people are not sleeping, average water usage at the multiple properties is 8.0 gallons per minute. The monitoring server 120 can therefore determine that a maximum threshold water usage for water usage modes of "home: high activity" is an amount greater than 8.0 gallons per minute, e.g., 10.0 gallons per minute.

In step 308, the system receives current water usage data representing water usage at the property. For example, the system may receive, from the water meter 150, current water usage data representing water usage of 11.0 gal/min at the property. The water usage of 11.0 gal/min may be due to a combination of operating fixtures such as an ice maker, a dishwasher, a sink, a toilet, a shower, etc. Additionally, there may be a leaky fixture such as a leaky shower.

In some examples, the current water usage data includes an instantaneous measurement of water flow rate at the property. For example, the current water usage data can include a water usage of 11.0 gal/min which may be a near real-time measurement, or an instantaneous measurement, of water usage at the property.

In some examples, the current water usage data includes a time-averaged measurement of water flow rate at the property. For example, the water usage of 11.0 gal/min may be an averaged measurement of water usage over a period of time, e.g., several minutes.

In step 310, the system determines, based on the current water usage data, that water usage at the property satisfies the water usage criteria. In some examples, determining that water usage at the property satisfies the water usage criteria includes determining that a water flow rate at the property exceeds a threshold water flow rate. For example, the water usage evaluator 112 can compare the water usage of 11.0 gal/min to the water usage threshold of 10.0 gal/min. The water usage evaluator 112 can determine that the water usage of 11.0 gal/min exceeds the water usage threshold of 10.0 gal/min. Thus, the water usage evaluator 112 can determine that the water usage at the property satisfies the water usage criteria.

In some examples, the current water usage data includes a water flow rate measured by a water meter that is configured to measure water flow rate through a water pipe that supplies water to the property. For example, the current water usage data can include a water flow rate measured by the water meter 150. The water meter 150 is configured to measure water flow rate through the water pipe 118 that supplies water to the property 102.

In step 312, in response to determining that the water usage at the property satisfies the water usage criteria, the system determines that a water leak exists at the property. For example, in response to determining that the water usage at the property of 11.0 gal/min exceeds the water usage threshold of 10.0 gal/min, the monitoring server 120 can determine that a water leak likely exists at the property 102.

In some examples, the system transmits, to a computing device associated with a resident of the property, a notification indicating that a water leak exists at the property. For example, the monitoring server 120 can transmit a notification to the mobile device 126 indicating that a water leak exists at the property 102.

Figure 4:
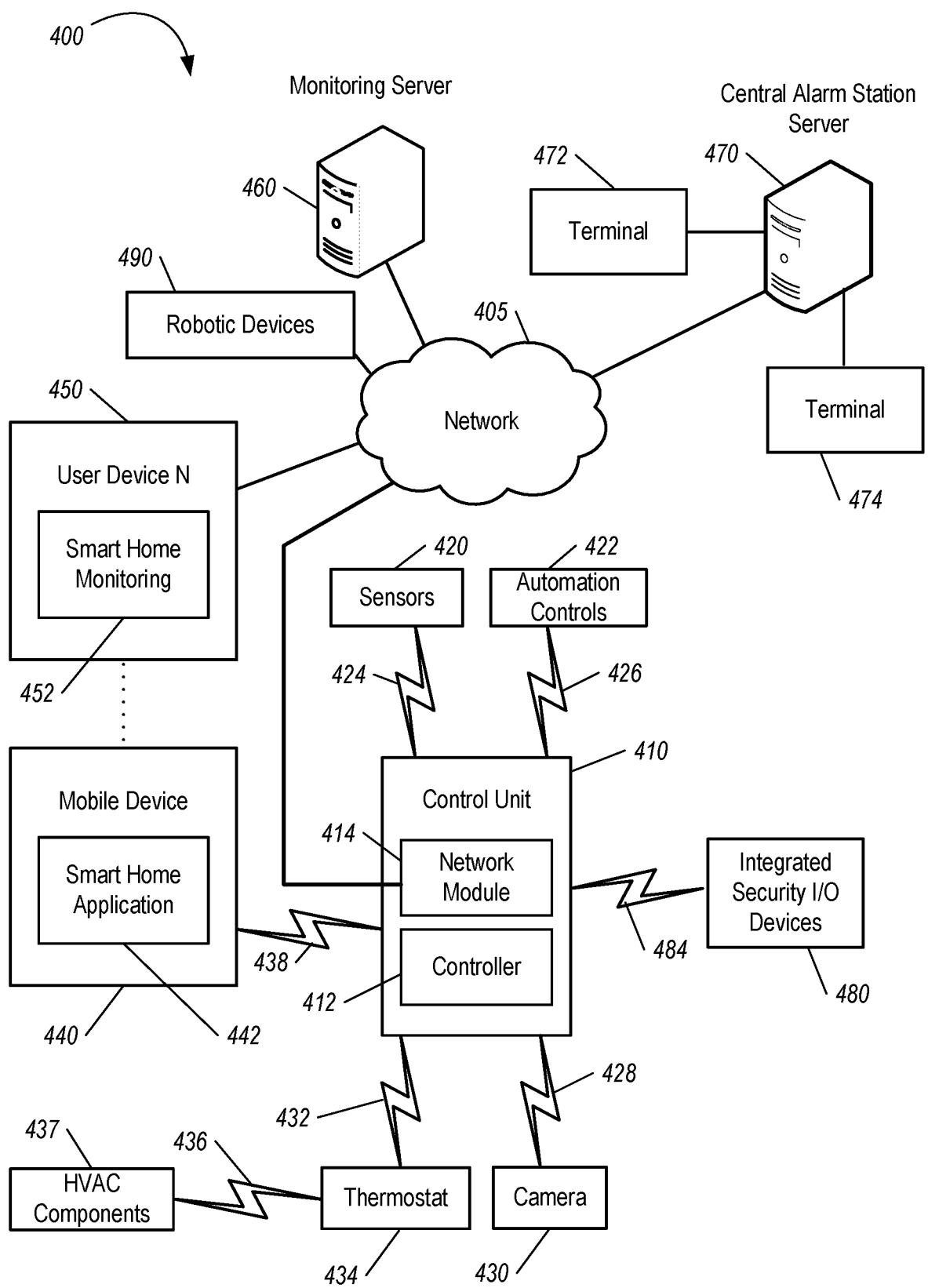
FIG. 4 is a diagram illustrating an example of a property monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-dO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 can include the sensors 106 and the water meter 150 of FIG. 1. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., resident 122). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   receiving, from one or more sensors that are located throughout a property that is monitored by a monitoring system, sensor data;
   determining that the sensor data is not available or is inconclusive;
   in response to determining that the sensor data is not available or is inconclusive, selecting, from a plurality of different water usage modes each of which have corresponding different one or more water usage criteria, a base water usage mode of the property;
   determining, using the base water usage mode, the one or more water usage criteria for the base water usage mode;
   receiving current water usage data representing water usage at the property;
   determining, based on the current water usage data, that water usage at the property satisfies the one or more water usage criteria; and
   in response to determining that the water usage at the property satisfies the one or more water usage criteria, determining that a water leak exists at the property.

2. The method of claim 1, comprising:
   maintaining the one or more water usage criteria corresponding to each of the plurality of different water usage modes, wherein determining the one or more water usage criteria comprises:
      selecting, from the maintained one or more water usage criteria, particular one or more water usage criteria corresponding to the selected base water usage mode.

3. The method of claim 2, wherein maintaining the one or more water usage criteria comprises:
   maintaining, for each of the plurality of different water usage modes, a threshold non-zero water flow rate corresponding to the selected base water usage mode.

4. The method of claim 2, wherein the maintained one or more water usage criteria are based on historical water usage data at the property.

5. The method of claim 2, wherein the maintained one or more water usage criteria are based on historical water usage data at multiple properties.

6. The method of claim 1, wherein the one or more water usage criteria include a threshold non-zero water flow rate at the property for the selected base water usage mode.

7. The method of claim 1, wherein the one or more water usage criteria include a threshold rate of change of water flow rate at the property for the selected base water usage mode.

8. The method of claim 1, wherein the sensor data includes an arming status of a monitoring system for monitoring the property, wherein selecting the base water usage mode comprises:
   selecting, based at least in part on the arming status, the base water usage mode.

9. The method of claim 1, comprising maintaining schedule data indicating scheduled water usage modes, from the plurality of different water usage modes, for corresponding times of day, wherein:
   the sensor data includes data indicating a time of day at the property, and
   selecting the base water usage mode comprises selecting, from the plurality of different water usage modes, the base water usage mode using at least the time of day at the property, the sensor data, and the schedule data.

10. The method of claim 1, comprising maintaining schedule data indicating scheduled water usage modes, from the plurality of different water usage modes, for corresponding times of day, wherein determining the one or more water usage criteria comprises:
    determining that a water usage mode of the property differs from a scheduled water usage mode of the property; and
    changing one or more first water usage criteria from the scheduled water usage mode to one or more adjusted water usage criteria corresponding to the selected base water usage mode.

11. The method of claim 1, wherein determining that water usage at the property satisfies the one or more water usage criteria comprises determining that a water flow rate at the property exceeds a threshold water flow rate.

12. The method of claim 1, wherein the current water usage data includes a water flow rate measured by a water meter that is configured to measure water flow rate through a water pipe that supplies water to the property.

13. The method of claim 1, comprising:
    transmitting, to a computing device associated with a resident of the property, a notification indicating that a water leak exists at the property.

14. A system comprising:
    one or more processors; and
    one or more storage devices, the one or more storage devices storing instructions that, when executed by the one or more processors, cause the one or more processors to perform operations comprising:
       receiving, from one or more sensors that are located throughout a property that is monitored by a monitoring system, sensor data;
       determining that the sensor data is not available or is inconclusive;
       in response to determining that the sensor data is not available or is inconclusive, selecting, from a plurality of different water usage modes each of which have corresponding different one or more water usage criteria, a base water usage mode of the property;

determining, using the base water usage mode, the one or more water usage criteria for the base water usage mode;

receiving current water usage data representing water usage at the property;

determining, based on the current water usage data, that water usage at the property satisfies the one or more water usage criteria; and in response to determining that the water usage at the property satisfies the one or more water usage criteria, determining that a water leak exists at the property.

15. The system of claim 14, the operations further comprising:

maintaining the one or more water usage criteria corresponding to each of the plurality of different water usage modes, wherein determining the one or more water usage criteria comprises:

selecting, from the maintained one or more water usage criteria, particular one or more water usage criteria corresponding to the selected base water usage mode.

16. The system of claim 15, wherein maintaining the one or more water usage criteria comprises:

maintaining, for each of the plurality of different water usage modes, a threshold non-zero water flow rate corresponding to the selected base water usage mode.

17. The system of claim 14, the operations further comprising maintaining schedule data indicating scheduled water usage modes, from the plurality of different water usage modes, for corresponding times of day, wherein:

the sensor data includes data indicating a time of day at the property, and selecting the base water usage mode comprises selecting, from the plurality of different water usage modes, the base water usage mode using at least the time of day at the property, the sensor data, and the schedule data.

18. The system of claim 14, the operations further comprising maintaining schedule data indicating scheduled water usage modes, from the plurality of different water usage modes, for corresponding of day, wherein determining the one or more water usage criteria comprises:

determining that a water usage mode of the property differs from a scheduled water usage mode of the property; and changing one or more first water usage criteria from the scheduled water usage mode to one or more adjusted water usage criteria corresponding to the selected base water usage mode.

19. The system of claim 14, the operations further comprising:

transmitting, to a computing device associated with a resident of the property, a notification indicating that a water leak exists at the property.

20. A non-transitory computer readable storage medium storing instructions executable by a data processing apparatus and upon such execution cause the data processing apparatus to perform operations comprising:

receiving, from one or more sensors that are located throughout a property that is monitored by a monitoring system, sensor data;

determining that the sensor data is not available or is inconclusive;

in response to determining that the sensor data is not available or is inconclusive, selecting, from a plurality of different water usage modes each of which have corresponding different one or more water usage criteria, a base water usage mode of the property;

determining, using the base water usage mode, the one or more water usage criteria for the base water usage mode;

receiving current water usage data representing water usage at the property;

determining, based on the current water usage data, that water usage at the property satisfies the one or more water usage criteria; and in response to determining that the water usage at the property satisfies the one or more water usage criteria, determining that a water leak exists at the property.

* * * * *